US005234015A

United States Patent [19]

Fumino

[11] Patent Number: 5,234,015

[45] Date of Patent: Aug. 10, 1993

[54] GAS SUPPLY MECHANISM WITH SAFETY DEVICE

[75] Inventor: Ichiro Fumino, Tokyo, Japan

[73] Assignee: Nippon Tansan Gas Company Limited, Tokyo, Japan

[21] Appl. No.: 871,649

[22] Filed: Apr. 21, 1992

[30] Foreign Application Priority Data

Apr. 26, 1991 [JP] Japan .............................. 3-38200[U]
Aug. 12, 1991 [JP] Japan .............................. 3-71250[U]

[51] Int. Cl.[5] .......................... F16K 51/00; B67B 7/50

[52] U.S. Cl. .............................. 137/68.1; 137/318; 222/5; 222/82; 222/83; 251/322

[58] Field of Search ...................... 137/68.1, 317, 318; 222/5, 82, 83, 83.5; 251/322, 323

[56] References Cited

U.S. PATENT DOCUMENTS 583,467 6/1897 Griffiths .............................. 137/68.1
2,580,426 1/1952 Heigis .............................. 137/68.1
4,694,850 9/1987 Fumino .............................. 137/318

FOREIGN PATENT DOCUMENTS 250856 4/1964 Australia .............................. 137/68.1

*Primary Examiner*—George L. Walton
*Attorney, Agent, or Firm*—Koda and Androlia

[57] ABSTRACT

The gas supply mechanism with a safety device of the present invention uses a small size high pressure gas container. In connection with a gas passage, a safety device is installed, which allows the gas in the passage to flow out gradually when the gas pressure in the passage rises excessively. A gas discharge port of this safety device is open on the same surface as the surface of the main body and does not protrude from the body.

8 Claims, 6 Drawing Sheets

GAS SUPPLY MECHANISM WITH SAFETY DEVICE

BACKGROUND OF THE INVENTION

1. Field of the Invention

The present invention relates to a gas supply mechanism with a safety device. This type of gas supply mechanism is used for blowing out, cooling, or cleaning an electronic part by selecting a type of small size high pressure gas container for use therein.

2. Description of the Prior Art

A gas supply mechanism using a high pressure gas cartridge has a conventional rupture disk or a recovery type safety valve as a safety device for the occurrence of a high pressure greater than a value that the mechanism allows.

When the safety device acts, a thrust is generated by a discharge gaseous flow. IF this thrust moves the mechanism, it causes a great danger. In order to prevent this movement, as FIG. 8 shows, it is necessary to open gas discharge ports 83 of the safety device for a gas supply mechanism 81 outward and opposite to each other on the same line so as to counterbalance the thrust. Inevitably, the portion that forms the gas discharge port 83 had to be made protruded outward from the mechanism.

Further, in a conventional rupture disk 84 consisting of a plurality of components, an accuracy of those components, a strength of mounting the rupture disk 84, and so on considerably affect an operating gas pressure tolerance, so that those matters had to be strictly controlled.

Furthermore, in a gas supply mechanism that uses a pressure governor to supply the primary pressure (high pressure) gas for the secondary pressure (low pressure) gas, there is a safety device at the secondary pressure side as is shown in FIG. 9. This safety device is realized by making a horizontal hole 92 in a cylinder 91, wherefrom in case an excessive (high) gas pressure occurs gas is discharged outward when a V packing 94 in a piston 93 passes through an aperture 95 of this horizontal hole 92.

As FIG. 10 shows, there is another safety device of the same type as the above, wherein a cylinder 91 is extended upward to prepare an enlarged portion 96 with an inner diameter greater than that of the cylinder 91, so that a horizontal hole 92 can be opened to the enlarged portion 96 through the clearance between the inner wall and the piston 93.

As an even further safety device of the same type as the above is shown in FIG. 11, this safety device is prepared by providing the inner wall of a cylinder 91 with one streak of vertical groove 97.

In FIGS. 9 and 10, when a pressure P2 at the secondary side rises to thrust the piston 93 upward, the V packing 94 is exerted by a pressure from the secondary side and once struck for a while to the peripheral edge portion of the aperture thereof. When the piston 93 moves up further, the V packing 94 is damaged by the edge of the aperture 95, thereby causing gas leakage when the V packing 94 returns. This phenomena is liable to occur especially when the cylinder 91 is made of metal. For this reason, it is necessary to chamfer the aperture 95 of horizontal hole 92 of the cylinder 91, but it is very hard to treat a small diameter cylinder for the chamfering.

In addition, in FIG. 11, the V packing 94 is forced to fall in a vertical groove 97 by gas pressure to shut the groove, thus resulting in the failure of gas supply function.

SUMMARY OF THE INVENTION

It is an object of the present invention to provide a gas supply mechanism having a safety device that discharges gas gradually when a gas pressure exceeds a set value.

It is another object of the present invention to provide a gas supply mechanism having gas discharge ports that can be opened on the same surface as the surface of the main body thereof.

A further object of the invention is to provide the open ration lever of a gas passage switching mechanism with a locking mechanism for protect undesired gas discharge.

Still a further object of the present invention is to provide a mounting mechanism that mounts a safety device to the main body of a gas supply mechanism securely protecting gasleakage.

Another important object of the present invention is to provide a safety device at the secondary pressure side in a pressure governor with a means of protecting the V packing of a piston from being damaged by the edge of the aperture for discharging gas from a cylinder.

Other and further objects of the present invention will be spontaneously apparent from the following description of embodiments with reference to the accompanying drawings.

DETAILED DESCRIPTION OF THE INVENTION

Figure 1:
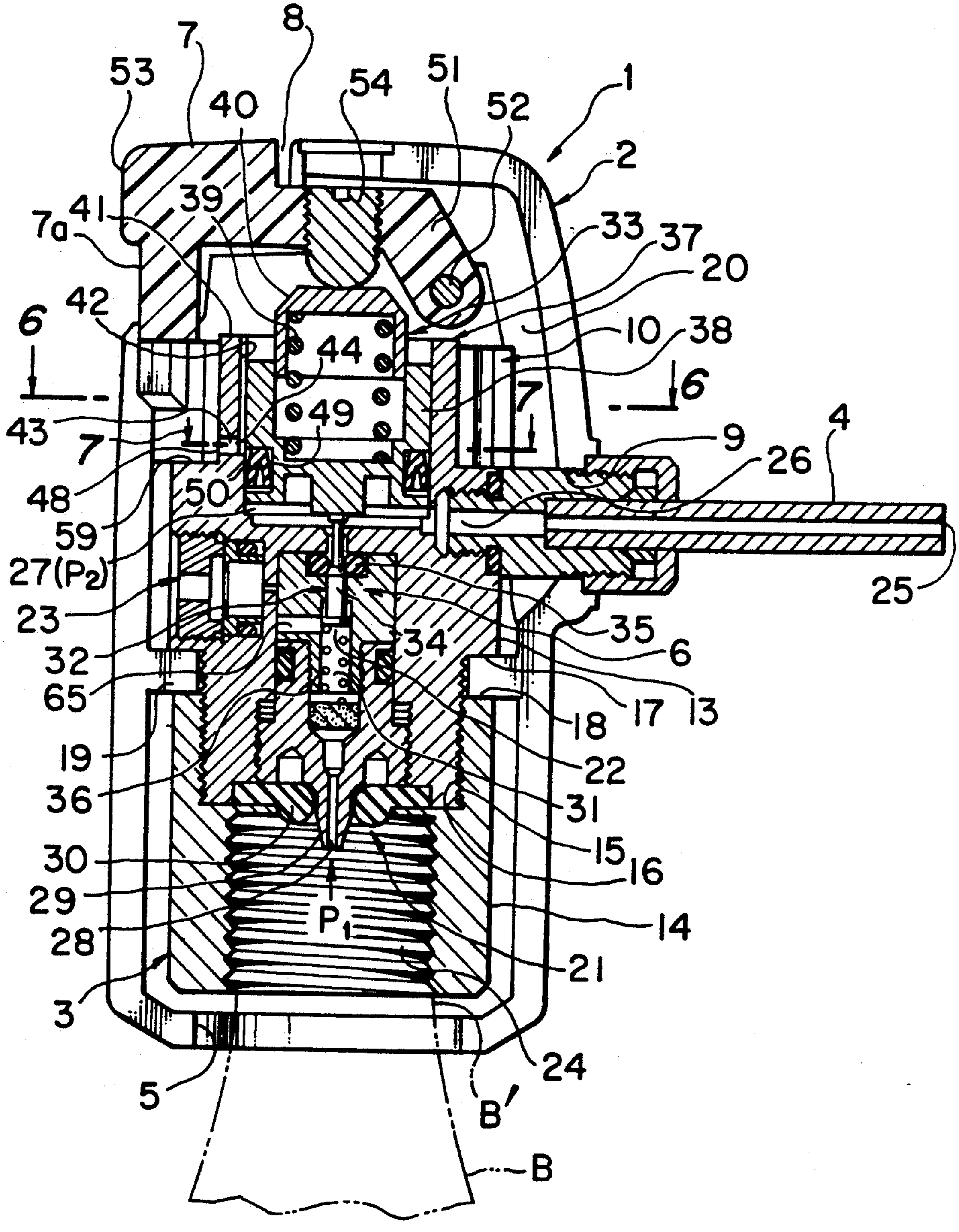
FIG. 1 is a vertical sectional side-view of an embodiment of a gas supply mechanism of the present invention.

In the following description, the same numerals or characters cover the same or similar parts.

Numeral 1 is a gas supply mechanism having a case 2, a main body 3, and a nozzle 4.

The case 2 is a cylindrical body assembled by bonding one half of vertically splitted halves to the other. On the bottom of this case 2 there is a port 5, through which a neck portion B' of a small size high pressure gas container B can be taken therein and thereout. On one side of the upper part of this case 2 there is an operational opening 8 for a lever 7 of a switching mechanism 6. Further, on the side thereof, there is an insertion port 9 for inserting a nozzle 4. Furthermore, on the back thereof there is a horizontal window 12 that a button 11 for operating a lock mechanism 10 can be protruded therethrough and that controls a movable range thereof.

The main body 3 is cylindrical and consists of a main body portion 13 and a mounting portion 14. Both portions are screwed together by a threaded outer circumference 15 of the main body portion 13 and a threaded inner circumference 16 of the mounting portion 14, and the bottom end face 17 of the threaded outer circumference 15 and the open end face of the threaded inner circumference 16 hold a flange 19 of the inner surface of case 2 therebetween, thereby coaxially housing the main body 3 in this case 2. In addition, as a result, a ring-like space 20 is formed between the case 2 and the main body 3.

The main body portion 13 has a takeout mechanism 21 at the bottom thereof for taking out gas from a small size high pressure gas container B, a passage 22 for discharging the taken out gas and a switching mechanism for this passage at the top thereof, and further a safety device 23 at the side thereof. In addition, the mounting portion 14 is provided with a mounting port 24 facing the port 5 of case 2 and surrounding the mounting mechanism 21 of main body portion 13 for the small size high pressure gas container B.

The nozzle 4 is freely removably from the main body 3 through the insertion port 9. In addition, when mounting and the nozzle 4, a tip 25 thereof protrudes outward from the case 2, while a base end 26 thereof communicates with the passage 22 at a downstream portion 27 of the switching mechanism 6.

The takeout mechanism 21 has the same structure as the conventional one consisting of a needle 29 having a gas passage 28 therein and a packing 30.

The passage 22 communicates with the gas passage 28 of needle 29 at the upstream portion 31 of switching mechanism 6, and the passage 22 communicates with the nozzle 4 at the downstream as aforementioned.

In FIG. 1, a switching mechanism 6 has a valve mechanism 32 and a pressure governing mechanism 33 that interlocks the valve mechanism 32 as is ordinary, and besides has a lever 7 and a locking mechanism 10.

The valve mechanism 32 consists of a valve pin 34 having an extra small portion that is freely movable up and down in the passage 22 and that allows gas to pass, a stationary O-ring 35 that is fitted closely onto this valve pin excluding the extra small portion thereof, and a spring 36 for returning the valve pin.

The pressure governing mechanism 33 aims at converting the primary pressure (high pressure) at the upstream portion 31 to the secondary pressure (low pressure) at the downstream portion 27 and has a cylinder 37, a piston 38, and a spring 39 and a spring cap 40. This cylinder 37 is installed in case 2 coaxially with case 2 and keeping a certain space 20 therebetween.

In this case, as a safety device for the secondary pressure, one stream of vertical groove 42 is prepared on the inner surface of a circumferential wall 41 of cylinder 37, and a discharge route 43 is prepared passing through this circumferential wall 41. This discharge route 43 connects an opening 44 in the vertical groove 42 with an opening 48 on an outer circumferential surface of cylinder 37. This opening 44 can also be positioned at the lower end of the vertical groove 42. The piston 38 is fitted into the cylinder 37 by sliding a V packing 50 fitted in a vertical groove 49 on the circumferential surface thereof. A spring 39 aims at applying a certain back pressure to the piston, and the top thereof is capped with a spring cap 40.

A base end portion 51 is axially supported by an axis 52 in the case 2 and a floating end 53 thereof is positioned close to an operational opening 8 of case 2 across the top of the cylinder 37. Further, in the middle of this lever 7 an adjusting screw 54 is screwed and the bottom end thereof is in contact with the top of the spring cap 40.

Figure 2:
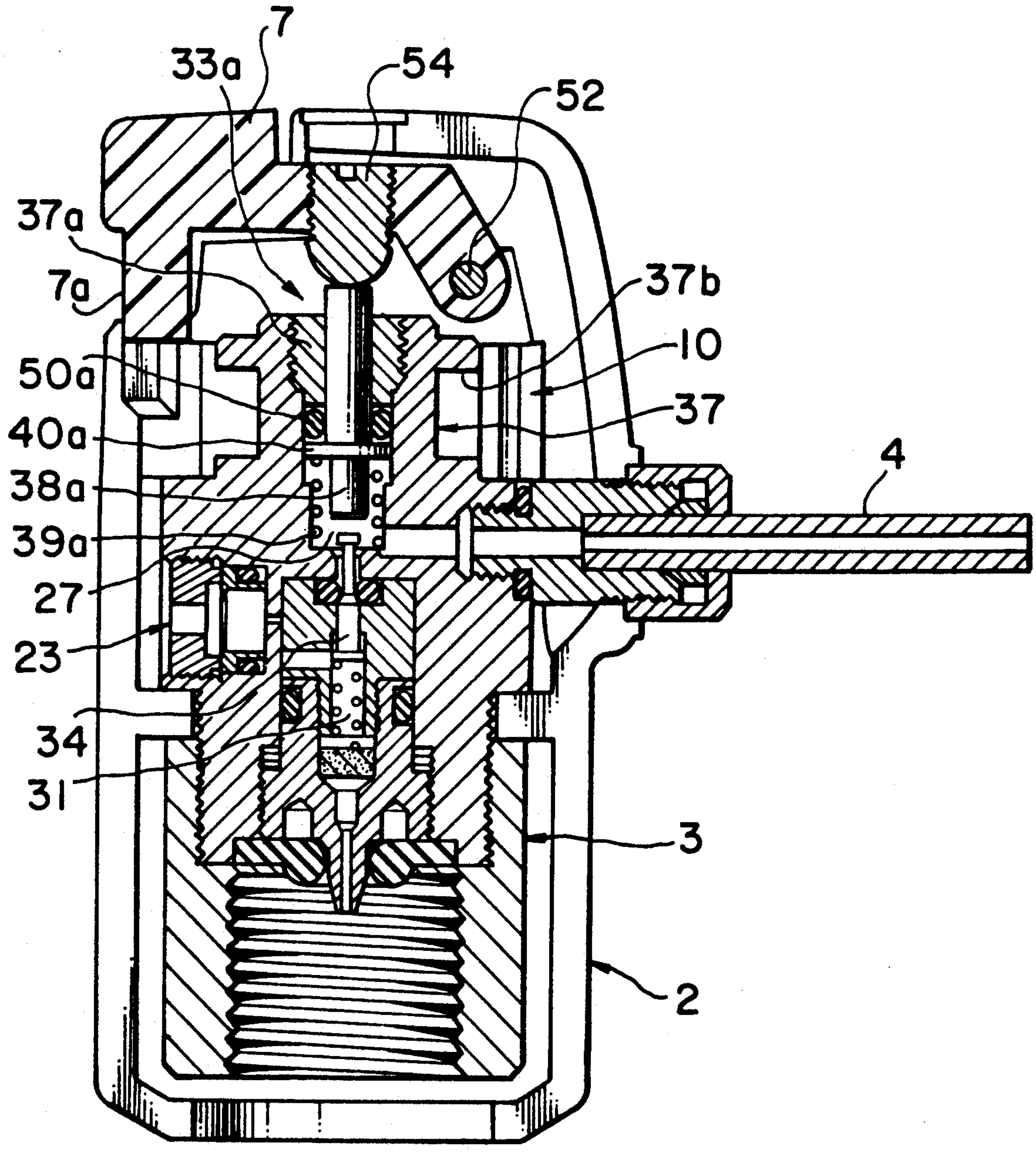
FIG. 2 is a vertical sectional side-view of an embodiment of a gas supply mechanism having no pressure governor of the present invention.

In FIG. 2, although a gas supply mechanism has no pressure governing mechanism 33, it has a pushrod mechanism 33*a*. In addition, a pushrod 38*a* is inserted in a cylinder 37 with the pushrod 38*a* airtightly sealed by an O-ring 50*a* and forced to move upward by a spring 39*a* at all times. This pushrod 38*a* is installed such that the upper portion thereof can freely slide up and down through a holder 37*a* screwed in the cylinder 37, the top thereof is in contact with adjusting screw 54 of the lever 7, and the bottom thereof can freely touch the top of valve pin 34.

Figure 6:
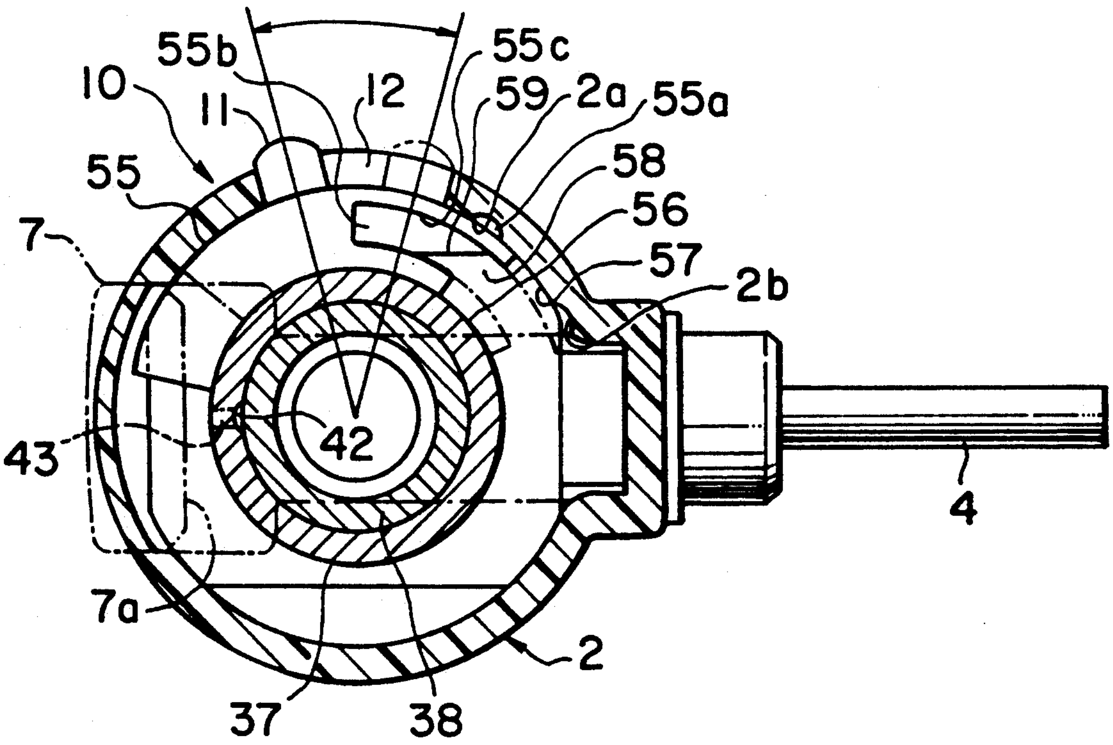
FIG. 6 is a sectional view cut along line 6—6 of FIG. 1.
Figure 7:
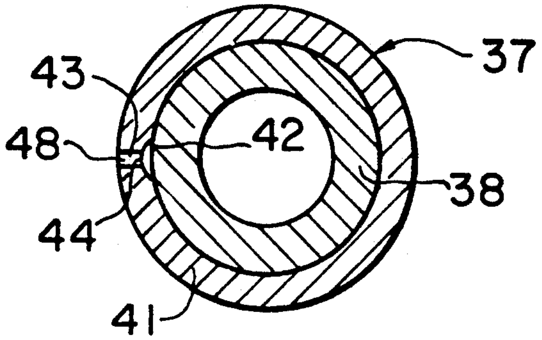
FIG. 7 is a sectional view cut along line 7—7 of FIG. 1.
Figure 8:
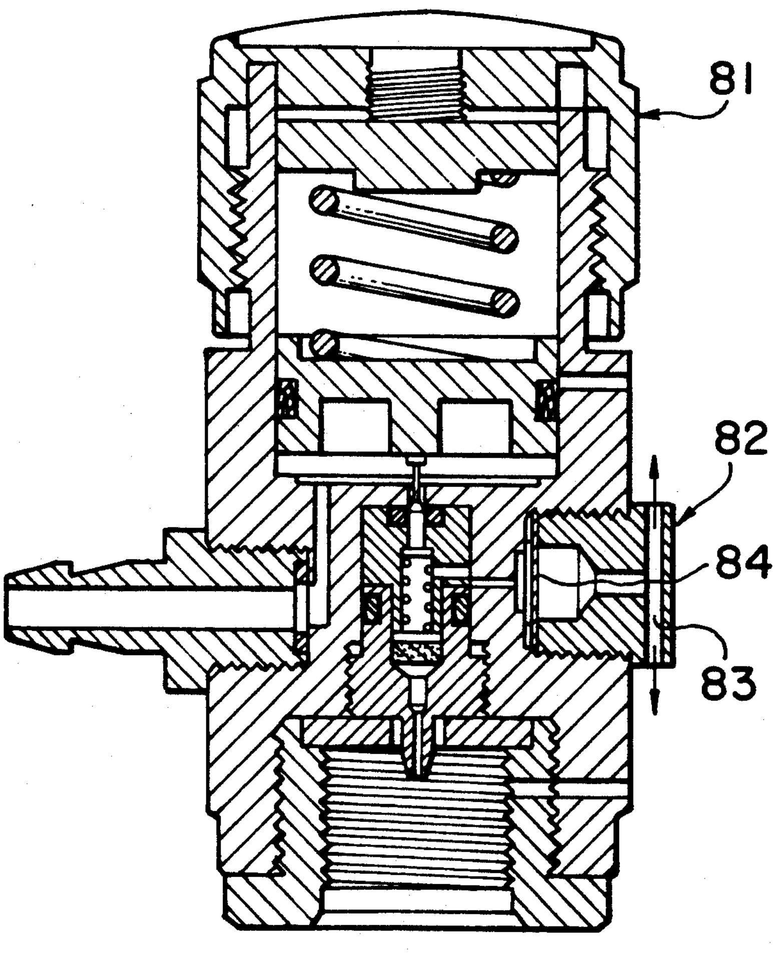
FIG. 8 is a vertical sectional view of an embodiment of a gas supply mechanism having the prior art of safety device.
Figure 9:
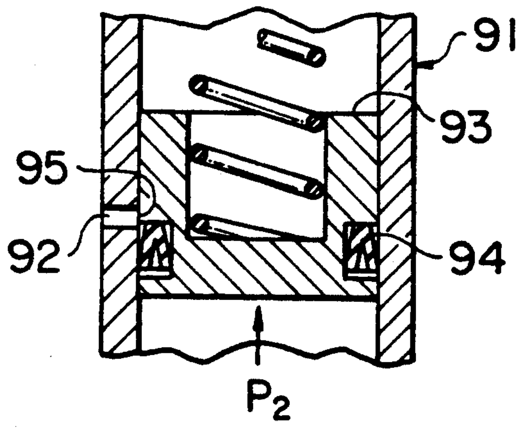
FIGS. 9 through 11 are vertical sectional views of individual embodiments of the prior art of safety device for secondary gas pressure.
Figure 10:
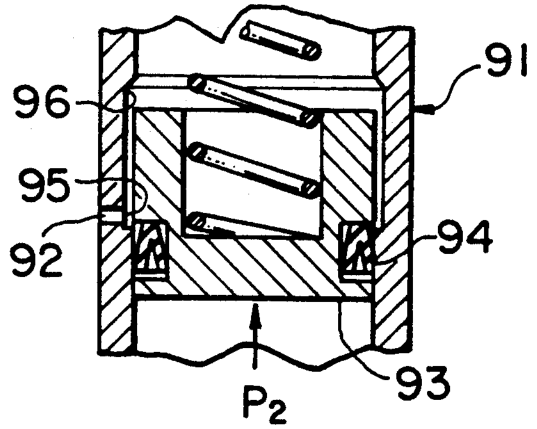
Figure 11:
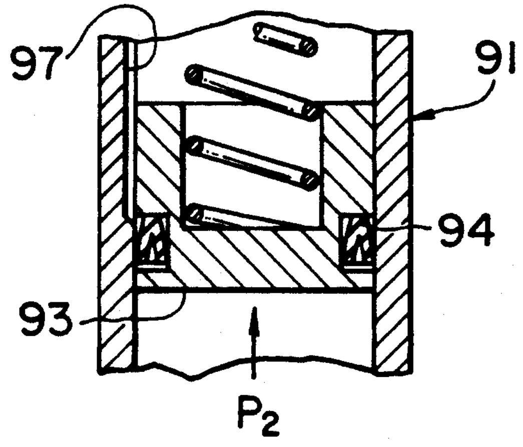

A lock mechanism 10, as is apparent from FIG. 6, is composed of an arc-like lock piece 55, an operation button 11 that is protrudent from the outer peripheral surface of this lock piece 55, a window 12 of the case 2 for protruding this button 11, and guide surfaces 56, 57, and 58. Guide surfaces 56, 57, and 58 are in contact with the inner surface, outer surface, and lower surface of lock piece 55 at the outer circumferential surface of cylinder 37, the inner circumferential surface of case 2, and the upper surface of a flange 59 of cylinder 37, respectively. The lock piece 55 can be freely moved by the button 11 within a range of this window. In addition, when the button 11, as the solid line shows in FIG. 6, touches the left end of window 12, the left end portion of lock piece appears in the traveling passage of lever 7 and when the lever 7 moves down the bottom of a suspension portion 7*a* of lever 7 touches the top of lock piece 55 to lock the lever 7. Further, when the button 11, as the imaginary line in FIG. 6 shows, touches the right end of window 12, the left end portion of lock piece 55 leaves the position where the bottom of suspension portion 7*a* of lever 7 touched the top of lock piece 55, thereby enabling the lever 7 to move down freely.

Numeral 55*a* is protrusion prepared at the right end portion on an outer circumferential surface of the lock piece 55 and is alternatively connected to indentation 2*a* or 2*b* positioned on a traveling passage of this protrusion 55*a* and formed on the inner wall surface of case 2 to restrain lock piece 55. Numeral 55*b a* represents a theft that provides the wing 55*c* of outer circumference with a spring force when the protrusion 55*a* of lock piece 55 come out from indentation 2*a* or 2*b* to make this protrusion 55*a* ready for the next connection.

In FIG. 2, although the outer circumferential surface of cylinder 37 has a groove 37*a*, since this groove aims at reducing the weight of cylinder 37, the action of the lock mechanism is not different from the function shown in FIG. 6.

A safety device 23 has a safety disk 60, a seal member 61, and a screw plug 63 with axial hole 62. The safety board 60 is so to speak the safety seal disk, wherein the safety disk is provided with a small truncated cone-like indentation 64 at the central part of the disk to gradually discharge gas when the gas pressure exceeds a set value.

This safety disk 60 determines an operating gas pressure by itself, unlike a rupture disk where other elements have to be taken into consideration.

The upstream portion 31 of the passage 22 communicates with the outer surface of the main body 3 via a primary pressure gas escape route or channel 65. In an embodiment of FIG. 3, although a member 66 where the safety device 23 is to be installed is independent of a member 67 where the upstream portion 31 is to be installed, whereby the primary pressure gas escape route 65 is realized by portion 65*a* and portion 65*b* of each member and a gap 65*c* of the fitting interface between a member 66 and a member 67, since the primary pressure gas has high pressure, such method does not cause gas flow to fail.

In an outer end portion of a main body 3 having the primary pressure gas escape route 65, an enlarged diameter portion 71 is installed that communicates with the escape route through a surface 70 of the outer end portion of the main body 3, and in this enlarged diameter portion 71 a safety disk 60 is inserted via sealant 61. Further, a screw plug 63 is screwed in this enlarged diameter portion 71 to hold the safety disk 60 at a predetermined position. Thus, this safety device 23 is installed in the main body 3.

Figure 3:
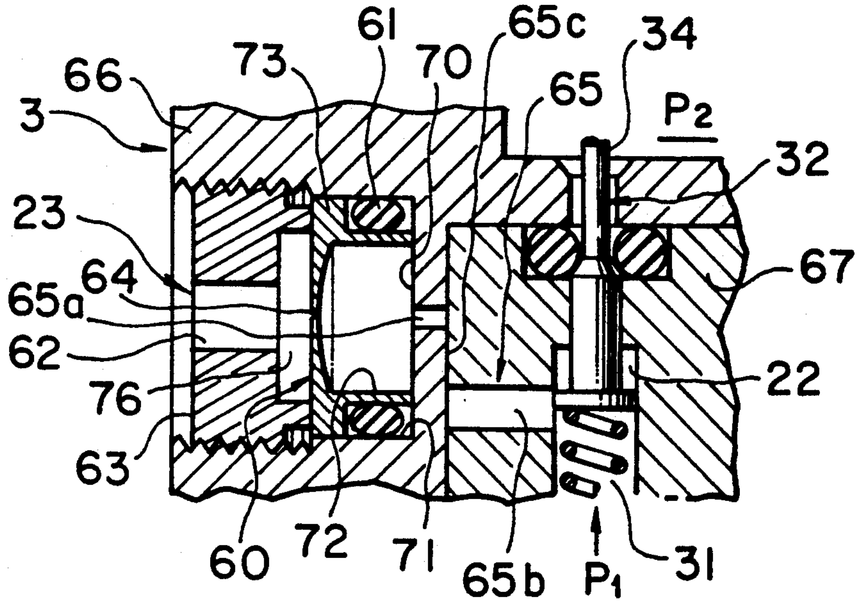
FIG. 3 is an enlarged view of a safety device portion of FIG. 1.

In FIG. 3, the safety disk 60 has a cylindrical portion 72 in the inner surface thereof and the sealant 61 plays a role of O-ring, and this O-ring is thrusted onto the outer surface of the cylindrical portion 72 and onto the inner surface of the enlarged diameter portion to seal gas leakage. The screw plug 63 has only to thrust the safety disk 60.

Figure 4:
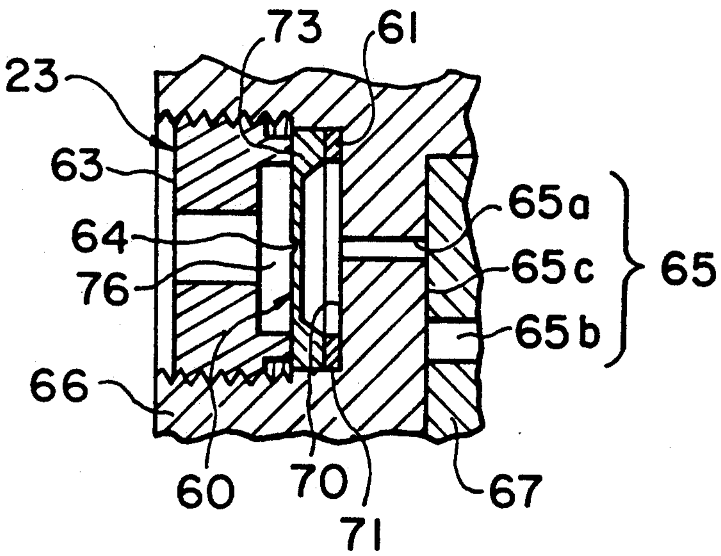
FIG. 4 is a view of another embodiment of a safety device.

In FIG. 4, the sealant 61 is a flat packing, which is thrusted by thrusting the safety disk using a screw plug 63 onto the inner surface of an outer circumferential portion 73 of the safety disk and onto the step surface 70 of enlarged diameter portion 71 to seal gas. In this embodiment, a tightening force for screwplug 63 is against the gas pressure.

Figure 5:
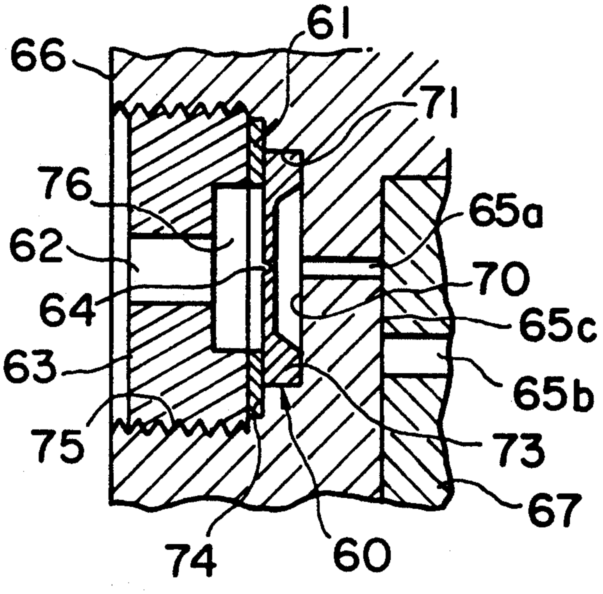
FIG. 5 is a view of a still further embodiment of a safety device.

In FIG. 5, the enlarged diameter portion 71 has a tapped hole 75 having a more enlarged diameter starting from the second step surface 74 at a position where the axial length from the first step surface is in agreement with the thickness of the safety disk 60. Sealant 61 is a flat packing, which is thrusted by thrusting the safety disk using a screw plug 63 onto the outer surface of an outer circumferential portion 73 of the safety disk, onto the second step surface 74, and onto the inner end face of the screw plug 63 to seal gas.

In any embodiment shown above, the diameter of the inner end face of the axial hole 63 of screw plug 63 becomes large to provide a space 76 for allowing the central portion of safety disk 60 to bend outward.

OPERATION

Case 2 houses main body 3. Between both, since there is a space 20, and between the main body 3 and the flange no airtightness is secured for high pressure gas, the high pressure gas freely flows in the case 2 and can flow outside through the port 5 or the operation opening 8. To this main body 3 a gas container B is attached. This gas container B may be filled by any desired gas, that is, for example, a carbon dioxide gas container for blowing to clean a semiconductor substrate, a liquefied carbon deoxide gas container with siphon tube for cooling, and so on depending upon application of gas. In addition, a nozzle 4 may also be changed to an appropriate one. Once a gas container is attached to a gas supply mechanism 1, the gas supply mechanism becomes ready for use. Hold the case 2, aim the tip of the nozzle 4 at an object, and push the lever 7 and press down the valve pin 34 of valve mechanism 32.

In FIG. 1, when operating the gas supply mechanism as stated above, the gas that stays in the upstream portion 31 flows into the downstream portion 27, further flows in the nozzle 4 while maintaining the gas pressure at a value adjusted by the pressure governing mechanism 33, and finally the gas is discharged toward an object to apply. In FIG. 2, the gas is discharged at the same pressure as shown in the upstream portion from the tip of the nozzle 4.

In this state, if the gas supply mechanism 1 is heated and the primary gas pressure P1 reaches up to an operating pressure set for the safety device 23, the central portion in the truncated cone like indentation 64 of safety disk 60 bends into a space 76 of axial hole 62 of the screw plug 63 and next the bottom of the indentation 64 is cracked, thus causing gradual gas leakage into the axial hole 62 through the crack. This leaked gas further passes through the gap between the case 2 and the main body 3 and is discharged outside from the port 5 or the operation opening 8.

Furthermore, if the secondary gas pressure P2 rises unusually high due to leakage at the primary gas pressure valve mechanism 32, or the like, the piston 38 springs a spring 39 to move up. Then, since part of the outer circumferential portion of V packing 50 enters a vertical groove 42, this vertical groove 42 and a discharge route 43 that communicates with the vertical groove 42 through an opening 44 are shut off. Since in this state the secondary gas pressure P2 is not discharged outside, the piston 38 further moves up and the V packing 50 passes by the opening 44 of the discharge route 43. At this point of time, the pressure gas passes through the discharge route 43 and is discharged out from an opening 48 on the outer circumferential surface of cylinder 37. Since V packing 50 is restrained by a sectional shape of the vertical groove 42 from being deformed, the packing is not thrusted strongly to the edge of opening 4 of the discharge route 43, thus being not damaged by the edge.

What I claim are:

1. A gas supply mechanism with a safety device comprising a case (2), a main body (3), and a nozzle (4), wherein the case (2) comprises a port (5) provided in a bottom of said case through which a neck portion (B') of a small size high pressure gas bomb (B) is inserted into and removed from, an operation opening (8) provided in said case, and an insertion port (9) that is open at a side of said case for inserting said nozzle (4), wherein said main body (3) is housed in said case (2) and comprises a mounting port (13) for said small size high pressure gas container (B), a takeout mechanism (21) for allowing gas to escape from a mounted small size high pressure gas container, a passage (22), a safety device (23), and a switching mechanism (6) provided between said takeout mechanism (21) and said passage (22) for selectively allowing gas escaping from said container to flow into said passage (22), said switching mechanism comprising a lever (7) coupled to said main body (3) and extending through said operation opening (8), wherein said nozzle (4) can be freely mounted to and removed from the main body (3) through the insertion port (9) of the case, and said nozzle comprises a tip (25) that protrudes outward from said case (2) when mounting said nozzle (4), a base end of said tip (25) communicates with said passage (22) at a downstream portion (27) of said switching mechanism (6), wherein said safety device (23) is of such type that when gas pressure exceeds a set value the gas is gradually discharged outside of said case, and comprises an enlarged diameter portion (71) provided in said main body (3), a primary gas pressure escape channel (65) disposed in said main body (3) thereby connecting said enlarged diameter portion (71) and said passage (22) for communicating the gas pressure to the safety device, a safety disk (60) having at least one truncated cone like indentation (64) which determines an operating pressure by cracking only said at least one indentation when a gas pressure exceeds said set value whereby said crack in said disk operates as a gas flow regulator means, a seal means (61) for sealing said safety disk within said enlarged diameter portion and a screw plug (63) with an axial hole (62) is disposed in said enlarged diameter portion (71) to hold said safety disk at a predetermined position therein.

2. A gas supply mechanism as claimed in claim 1, wherein said case (2) and said main body (3) are individually cylindrical, wherein said main body (3) consists of a main body portion (13) and a mounting portion (14) comprising a mounting port (24), wherein both portions thereof are connected with each other by screwing screw (15) on the outer circumference of said main body portion (3) and screw (16) on the inner circumference of said mounting portion (14) to clamp a flange (19) of the inner surface of said case (2) between a step surface (17) at the bottom end of screw (15) and an end surface (18) at the end of screw (16), wherein a ring-like space (20) is formed between case (2) and main body (3).

3. A gas supply mechanism as claimed in claim 1, wherein said switching mechanism (6) comprises a valve mechanism (32), a pressure governing mechanism (33), a lever (7), a locking mechanism (10), wherein said pressure governing mechanism (33) comprises a cylinder (37), a piston (38), a spring (39), and a spring cap (40), wherein said cylinder (37) is installed in said case (2) coaxially with said case (2) and maintaining a space (20) therebetween, wherein a base end portion (51) of said lever (7) is supported axially by an axle (52) in case (2), wherein a play end portion (53) of said lever (7) is present facing an operation opening (8) across over said cylinder (37), wherein between said play end portion (53) and said base end portion (51) an adjusting screw (54) is screwed in said lever (7) and the bottom end thereof is in contact with the top of said spring cap (40), wherein said locking mechanism (10) comprises an arc-like lock piece (55), an operation button (11) which is protrudent outward from the outer circumferential surface of said lock piece (55), and guide surfaces (56, 57, 58) of said lock piece (55), wherein said button (11) is protrudent outward from the case (2) through a window (12) of said case (2), wherein said guide surfaces are individually in contact with each inner circumferential surface, outer circumferential surface, and bottom surface of said lock piece (55) at the outer circumferential surface of the cylinder (37), inner circumferential surface of case (2), and the upper surface of the flange (59) of cylinder (37), respectively, wherein said lock piece (55) is freely movable by said button (11) within a range of said window (12), wherein one end of said lock piece is present in the traveling passage of lever (7) to lock the lever (7) and the other end thereof releases said lever (7).

4. A gas supply mechanism as claimed in claim 3, wherein the piston (38) of said pressure governing mechanism (33) has a V packing (50) in a groove on the outer surface thereof, wherein said cylinder (37) has a streak of vertical groove (42) on the inner wall thereof, and wherein a circumferential wall (41) thereof has a discharge route (43) that connects an opening (44) in said vertical groove (42) with an opening (48) on the outer surface thereof to communicate therebetween.

5. A gas supply mechanism as claimed in claim 1, wherein said switching mechanism (6) comprises a valve mechanism (32), a pushrod mechanism (33a), a lever (7), and a locking mechanism (10), wherein said pushrod mechanism (33a) comprises a cylinder (37), a pushrod (38a), a spring (39a), a spring bearing (40a), an O-ring (50a), and a holder (37a), wherein said cylinder (37) is installed coaxially with case (2) and maintaining a space (20) therebetween, wherein in said cylinder (37) said pushrod (38a) is inserted keeping the pushrod (38a) airtight and being forced to tend to move upward by a a spring (39a), wherein the upper portion of said pushrod (38a) freely and vertically passes through a holder (37a) screwed into cylinder (37), wherein the bottom of said pushrod is present above the upper portion of a valve pin (34) thereof so as to freely touch the upper portion thereof, wherein the base end (51) of lever (7) is axially supported by an axis (52) in the case (2), wherein a play end (53) is present closely facing the operation opening (8) across over the cylinder (37), wherein in the middle of the lever (7) an adjusting screw (54) is screwed therein and in contact with the top of the pushrod (38a), wherein a locking mechanism (10) comprises an arc-like lock piece (55), an operation button (11) which is protrudent from the outer circumferential surface of the lock piece (55), and guide surfaces (56, 57, 58) of the lock piece, wherein said operation button (11) is protrudent outside from case (2) through the window (12), wherein guide surfaces (56, 57, 58) are in contact with each inner circumferential surface, outer circumferential surface, and the bottom of the lock piece (55) at the outer circumferential surface of cylinder (37), the inner circumferential surface of case (2), and the upper surface of flange (59) of cylinder (37), respectively, wherein said lock piece (5) is freely movable by the button (11) within the window(12), wherein one end is present in the traveling passage to lock the lever (7), wherein the other end thereof is used to release the locked lever (7).

6. A gas supply mechanism as claimed in claim 1, wherein said safety disk (60) has a cylindrical portion (72) in the inner side thereof, wherein said sealant (61) is an O-ring, wherein said O-ring is kept thrusted against both the outer surface of said cylindrical portion (72) and the inner wall of said enlarged diameter portion (71) to seal gas.

7. A gas supply mechanism as claimed in claim 1, wherein said sealant (61) is a flat packing that is kept thrusted against both the inner surface of the outer circumferential portion (73) and the step surface (70) by thrusting the safety disk (60) with said screw plug (63) to seal gas.

8. A gas supply mechanism as claimed in claim 1, wherein said enlarged diameter portion (71) becomes a tapped hole (75) with a further enlarged diameter prepared by the second step surface (74) at a position where the axial length thereof is in agreement with the thickness of the safety disk (60), wherein sealant (61) is a flat packing that is kept thrusted against the outer surface of outer circumferential portion (73) of said safety disk, the second step surface (74), and the inner end surface of said screw plug (63) by screwing in the screw plug (63) to seal gas.

* * * * *